United States Patent [19]

Egli et al.

[11] Patent Number: 5,000,571
[45] Date of Patent: Mar. 19, 1991

[54] METHOD OF FABRICATING A READOUT APPARATUS FOR A RING LASER GYROSCOPE

[75] Inventors: Werner H. Egli, Maple Grove; Robert A. Pajak, Ham Lake, both of Minn.

[73] Assignee: Honeywell Inc., Minneapolis, Minn.

[21] Appl. No.: 332,268

[22] Filed: Mar. 31, 1989

[51] Int. Cl.$^5$ .............................................. G01C 19/64
[52] U.S. Cl. .................................................... 356/350
[58] Field of Search ......................................... 356/350

[56] References Cited

U.S. PATENT DOCUMENTS 4,542,955  9/1985  Graindorge et al. ............... 356/347

FOREIGN PATENT DOCUMENTS 0201074  11/1986  European Pat. Off. ............ 356/350

Primary Examiner—Samuel Turner
Attorney, Agent, or Firm—Robert A. Pajak

[57] ABSTRACT

A gyro readout mask is made from the actual readout interference fringe pattern. A photographic image of the readout interference fringe pattern is made, and the resulting photographic image, or a derivative thereof, is itself used as the mask.

10 Claims, 3 Drawing Sheets

METHOD OF FABRICATING A READOUT APPARATUS FOR A RING LASER GYROSCOPE

BACKGROUND OF THE INVENTION

The present invention relates to a ring laser gyroscope. More particularly it relates to a method for fabricating a readout apparatus for such a ring laser gyroscope.

Ring laser gyros are well known and are particularly described in U.S. Pat. No. 3,373,650, issued to Killpatrick, and U.S. Pat. No. 3,390,606, issued to Podgorski. Ring laser gyros of the type referred to commonly utilize a block of material that is dimensionally stable, both thermally and mechanically. The block usually includes a plurality of interconnected gas-containing tunnels or passages which form a closed-loop path in the shape of a triangle, a rectangle, or any polygonal path. At each intersection of a pair of interconnected tunnels is a mirror mounted on the block. This arrangement of mirrors and interconnected tunnels forms an optical closed-loop path. Further, at least one anode and one cathode are each mounted on the block and in communication with the gas. Each of the components, including the mirrors, anode, and cathode, must be sealed to the block to form a gas-tight seal. The block is usually filled with a lasing gas such as a mixture of helium and neon. A sufficiently large electrical potential is applied between the anode and cathode to cause a discharge current therebetween which results in the production of a pair of counter-propagating laser beams within the block.

In order to obtain useful information from a ring laser gyro of the type described above, a small percentage of each of the counter-propagating laser beams is allowed to pass through one of the mirrors, known as the output mirror. The light beams passing through the output mirror are commonly passed through a prism which combines the beams at slightly different angles and thereby creates a readout interference fringe pattern. When the gyro is rotated about its input axis, the counter-propagating beam frequencies change slightly, one increasing and the other decreasing in proportion to the rotation rate of the gyro. The frequency difference between the frequencies of the beams results in a beat frequency which is indicated by a rate of movement of the fringe pattern across the photodetectors, as is well known.

The resulting interference fringe pattern which exits from the prism is commonly directed to impinge upon a pair of photodetectors. Generally, in the art of ring laser gyros, the readout apparatus requires the pair of photodetectors to be separated by one quarter of the fringe spacing of the readout interference fringe pattern. With the photodetectors separated by the aforesaid spacing, the photodetector output signals will be in phase quadrature in response to a moving interference fringe pattern, as is well known.

In U.S. Pat. No. 4,152,072 issued to Hutchings, a laser gyro readout interference fringe pattern is projected onto a mask before impinging upon a pair of photodetectors. The mask, as taught by the aforementioned patent, consists of parallel alternating opaque and transparent regions, or stripes, which are in parallel with the fringes of the readout interference fringe pattern. The mask stripes of Hutchings are spaced at slightly different intervals than the impinging readout interference fringe pattern. As the fringe pattern moves across the mask, the photodetectors provide output signals which are out of phase relative to each other, indicative of the beat signal.

In turn, the fringes passing by either photodetector are counted for indication of rotation angle, and the pair of out of phase photodetector signals are used to determine direction.

Alternatively, U.S. Pat. No. 4,676,643, issued to Vescial, teaches another mask readout system for obtaining a pair of out of phase photodetector signals. In Vescial, the mask consists of parallel alternating opaque and transparent stripes having the same periodicity as the readout interference fringe pattern. The mask is positioned in front of a pair photodetectors. The mask is oriented relative to the readout interference fringe pattern such that there is a predetermined angle between the stripes of the mask and the fringes of the readout interference fringe pattern.

As taught by Vescial, by virtue of the readout interference fringe pattern passing through the "tilted" mask, a light spot is created on the photodetector side of the mask. The resulting light spot exhibits a Moire fringe pattern characteristic. In turn, photodetectors which are spaced by one quarter of the Moire fringe pattern periodicity respond to the Moire interference fringe pattern. The photodetectors then provide output signals which ar out of phase relative to each other, indicative of the beat signal. The Moire fringes passing by either photodetector are counted for indication of rotation angle, and the pair of out of phase photodetector signals are used to determine direction in the usual manner.

Generally, the spacing of the parallel stripes of the mask in either the Hutchings patent or the Vescial patent is chosen with respect to the fringe spacing of the readout interference fringe pattern.

Due to variances in angular alignment of the output mirrors between "identical" gyros, there is great variation in orientation and spatial frequency between their respective fringe patterns. Consequently, since mask fabrication depends upon fringe spacing, identical gyros require individual mask fabrication.

SUMMARY OF THE INVENTION

It is an object of the present invention to make a gyro readout mask to match the readout interference fringe pattern of the gyro.

It is a further object to provide an efficient means for manufacturing gyro readout masks of alternating parallel transparent and opaque stripes which have interval spacing as a function of the spacing between interference fringes.

In the present invention, a gyro readout mask is made from the actual readout itself during gyro operation. The gyro is operated such that a stationary fringe pattern is produced. A photographic image of the stationary fringe pattern is made, and the resulting photographic image, or a derivative thereof, is itself used as the mask.

DETAILED DESCRIPTION OF THE INVENTION

Figure 1:
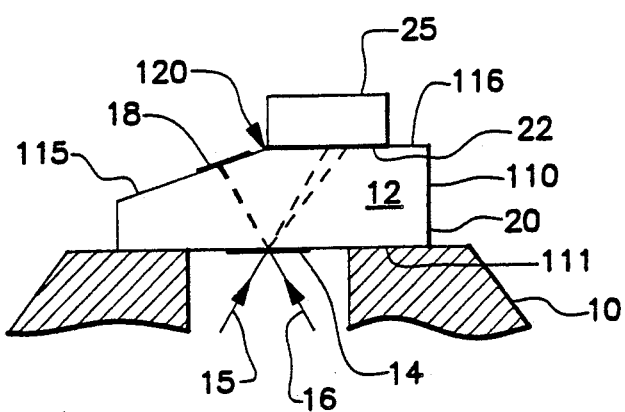
FIG. 1 is an illustration of a ring laser gyro readout system for generating an interference fringe pattern.

FIG. 1 illustrates an optical readout system, similar to U.S. Pat. No. 4,677,641 issued to Podgorski, for producing an interference fringe pattern resulting from the combining of a portion of each of the laser beams in a ring laser angular rate sensor. FIG. 1 shows only one of the reflection surfaces which defines in part the optical closed-loop path of a ring laser gyro. Sensor block 10 is of the type shown and described in U.S. Pat. No. 3,390,606 issued to Podgorski.

Fixed to block 10 is mirror/readout prism 12 including substrate 110 for transmitting light. Substrate 110 includes a first major surface 111 suitably polished and optically coated to provide a partially transmissive mirror 14 for reflecting within block 10 a major portion of counter-propagating laser beams 15 and 16 impinging thereon. The angle between beams 15 and 16 depends upon the optical closed-loop path chosen, i.e. triangular (60 degrees), rectangular (90 degrees), and the like.

Substrate 110 further includes a second surface 115 suitably polished and optically coated for providing a mirror 18. Mirror 18 is positionally located so as to reflect back into prism 12 that portion of beam 16 transmitted through prism 12 and mirror 14. Substrate 110 is constructed such that surface 115 is at a selected angle relative to surface 111 to select the angle between the incident and reflected beams at the surface of mirror 18. The angle between the incident and reflected beams is herein referred to as the "beam angle".

The reflected beam from mirror 18 is directed to reflect from mirror 14 so as to travel within prism 12 at a slight angle relative to that portion of beam 15 transmitted through mirror 14. This slight angle is substantially equal to the aforementioned "beam angle". The portion of beam 15 transmitted through mirror 14, and the doubly reflected portion of beam 16, arrive at transmissive surface 116 so as to form a gyro readout interference fringe pattern on the surface thereof.

Also shown in FIG. 1 is a dual photodetector sensor 25 coupled to surface 116 for being responsive to the interference fringe pattern passing therethrough. The arrangement of the dual photodetectors relative to the impinging readout interference fringe pattern will be described in more detail below.

Sensor 25 is generally secured to surface 116. Alternatively, sensor 25 may be spatially removed from surface 116 but still be responsive to the impinging interference fringe pattern transmitter through surface 116.

The present application is directed to gyro readout systems in which a mask is interposed between readout prism surface 116—the surface at which the readout interference fringe pattern exits—and a sensor 25 similar to the readout system taught in the aforementioned Vescial patent. In Vescial, and in the present application, the dual photodetectors are positioned to be concurrently responsive to portions of the same spatial fringes, i.e., the same light and dark intensity bands. Alternatively, the dual photodetectors may be spatially separated to be responsive to different portions of the same fringe or different fringes.

Figure 2:
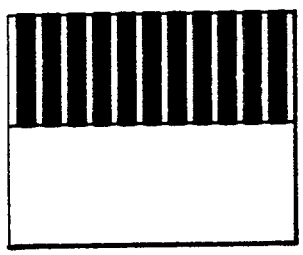
FIG. 2 is an illustration of a readout apparatus fringe mask according to Hutchings.
Figure 3:
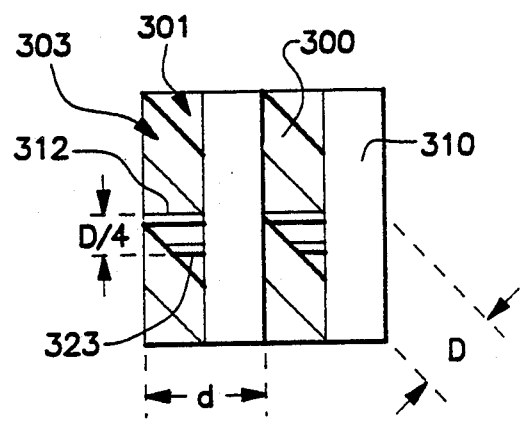
FIG. 3 is an illustration of a readout apparatus fringe mask according to Vescial.

FIG. 2 illustrates a mask as described in U.S. Pat. No. 4,152,072 issued to Hutchings in which the dual photodetectors (not shown) are spatially separated and are responsive to different fringes. FIG. 3 illustrates a mask as described in Vescial in which the photodetectors are positioned to be concurrently responsive to portions of the same spatial fringes, i.e., the same light and dark intensity band.

Again referring to FIG. 1, a single mask pattern 120 may be interposed between readout prism surface 116 and dual photodetector sensor 25 as a means of selecting the spatial portions of the light and dark fringes of the readout interference fringe pattern that each detector samples.

In the following exposition, the mask and dual photodetector sensor system of Vescial will be assumed. In Vescial, the direction of a moving readout interference fringe pattern is determined by monitoring a pair of photodetector signals which are out of phase relative to each other. The photodetector signals are made to be out of phase with each other by the use of a mask which has parallel opaque and transparent stripes which are tilted with respect to the impinging fringes of the readout interference fringe pattern.

By using this technique of Vescial, a Moire fringe pattern is produced on the opposite side of the mask which the photodetectors are responsive to. In turn, the two photodetector signals will be out of phase, indicative of the Moire fringe pattern impinging thereon, and will be out of phase relative to each other. In turn, the photodetector signals may be utilized to determine the direction of gyro rotation.

An example of a tilted fringe mask is illustrated in FIG. 3, as is shown and described in the aforementioned Vescial patent. As illustrated in FIG. 3, a mask 300 is positioned such that a plurality of alternating opaque and transparent stripes, 301 and 303, respectively, are tilted at a selected angle with respect to the fringes of an impinging interference fringe pattern 310. Photodetectors 321 and 323 are positioned behind mask 300, and are spatially separated by one quarter of the Moire fringe spacing "D", as taught by Vescial.

Referring again to FIG. 1, in the present invention the gyro is operated such that a stationary readout fringe pattern is produced, i.e., one that is not moving. An imaging means, herein by example, a photosensitive film, is strategically placed in the position that the mask was intended to occupy. Consequently, the readout interference fringe pattern which is transmitted through surface 116 impinges upon the photosensitive film, which leaves a photographic image on the photosensitive film in the form of alternating opaque and transparent stripes of the interference fringe pattern. The photosensitive film may then itself be used as the mask 120 of FIG. 1, or mask 300 of FIG. 3.

Figure 4:
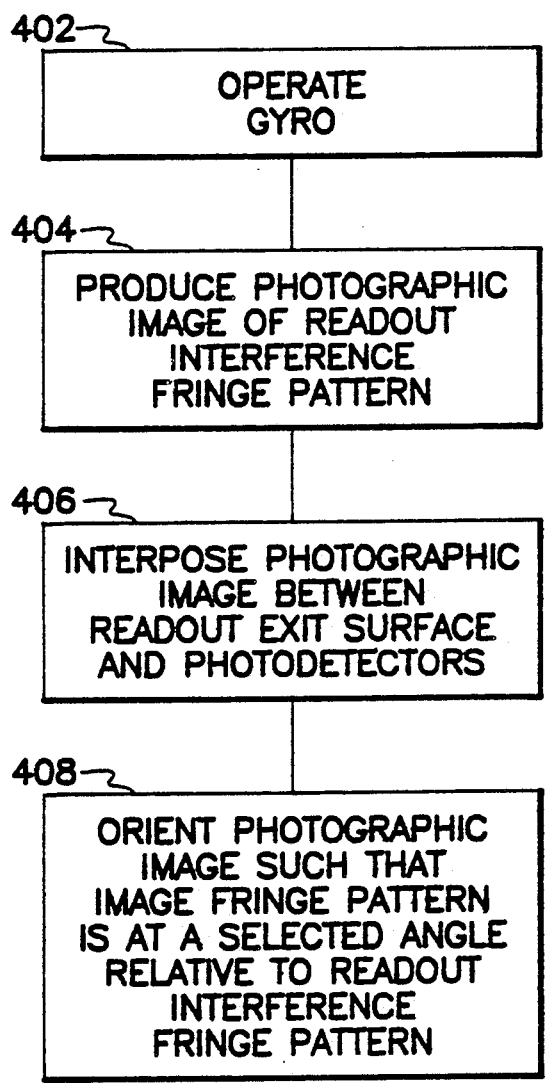
FIG. 4 is a flow diagram of one method of the present invention.

The method as just described is diagrammatically depicted in a flow diagram illustrated in FIG. 4. As illustrated in FIG. 4, the gyro is first operated 402 to allow the production of a photographic image 404 utilizing any of a wide variety photosensitive films. After the photosensitive film has been appropriately processed, the photographic image is then interposed between the readout exit surface and the photodetectors 406. Lastly, the photographic image is oriented 408 such that the image is at a selected angle relative to the readout interference fringe pattern so that the photodetectors produce the intended response to a moving interference fringe pattern.

As applied to the principle of Vescial already discussed, mask 120 provided by the photographic film may then be positioned such that the mask stripes are tilted to a selected angle with respect to the fringes of the impinging readout interference fringe pattern. The result is that a Moire fringe pattern is seen by sensor 25, as already described, and rotation and direction information may then be obtained from the photodetector output signals.

The imaging means for producing a photographic image, in accordance with the present invention, may be provided by a wide variety of apparatuses and techniques. Although the present invention has been described by way of a photosensitive film, other techniques are of course possible which are within the scope of the present invention.

For example, application of dry-copy machine principles may be utilized. In this scheme, the readout interference fringe pattern may be first projected onto a small charged selenium surface (perhaps simply placed right onto the dual photodetector sensor 25 surface), after which powder is dusted onto it, and subsequently baked onto a transparency, or perhaps even directly onto the photodetector itself.

In still another technique, the photodetector surface may have a laser sensitive surface in which the laser generated readout interference fringe pattern would destructively and permanently affect the light sensitivity of the photodetector. Afterwards, the sensor could be passivated to prevent further deterioration of the photodetector surface. In turn, the sensor, itself could be rotated to provide the proper tilt angle between the mask stripes, i.e. the photodetector sensitivity stripes, to provide the intended phasing of the photodetector output signals.

Figure 5:
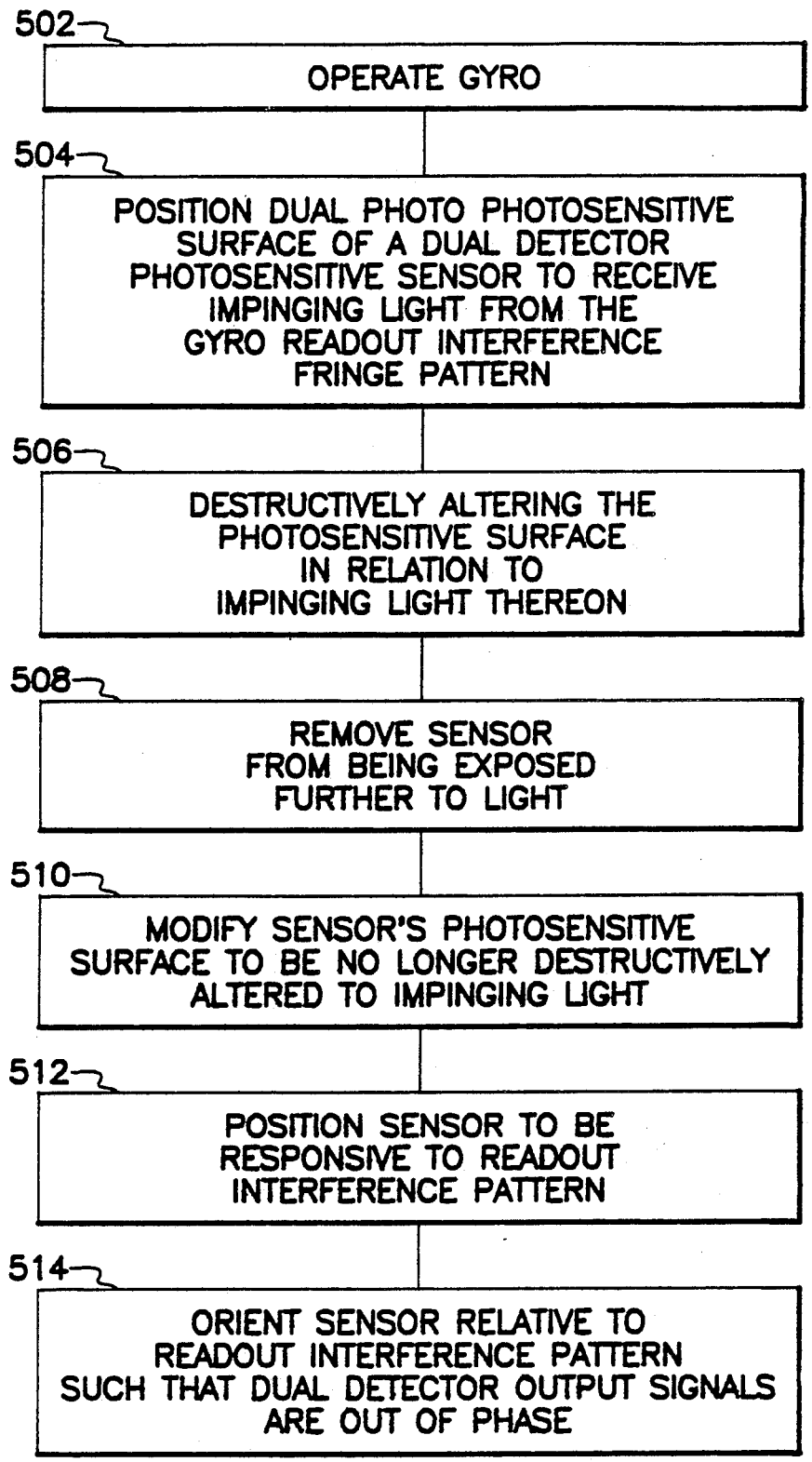
FIG. 5 is a flow diagram of another method of the present invention.

FIG. 5 diagrammatically illustrates a flow diagram in accordance with the invention as just described above. FIG. 5 is substantially similar to FIG. 4 except that the photographic image is replaced by the dual photodetector sensor having a photosensitive surface. More specifically, as illustrated in FIG. 5, the gyro is first operated 502 to produce an interference fringe pattern. The dual photosensitive sensor is positioned 504 to be responsive to the light from the gyro readout interference fringe pattern. In turn, the photosensitive surface is destructively altered 506 by the light from the interference fringe pattern. The sensor is removed 508, and then the sensor is modified 510 such that the photosensitive surface is not longer destructively altered by impinging light. Following, the sensor is then positioned 510 to be responsive to the readout interference fringe pattern, and subsequently oriented 514 relative to the readout interference fringe pattern such that the dual detector output signals are out of phase with each other to a moving interference fringe pattern.

In all these photographic imaging schemes, the result would be a mask which fits the individual fringe pattern perfectly, in size and orientation. Additional modifications to these schemes could include automatic contrast and intensity control on the image, so as to make the mask vary from 0% to 100% opaque between transparent and opaque regions, with a mean opacity of 50%.

It should be recognized to those skilled in the art that the principles of the present invention as applied to the readout scheme of Vescial may also be applied to the readout scheme of Hutchings as described above. The present invention is particularly applicable where it is desired to obtain a mask containing a virtual image or proportionate image of a gyro readout interference fringe pattern.

Further, it should be recognized that the present invention is applicable to any ring resonator similar to that known in art of ring laser gyros, as well as other modifications, without departing from the true spirit and scope of the present invention.

The above referred-to patents are herein incorporated by reference.

The embodiments of the invention in which an exclusive property or privilege are claimed are defined as follows:

1. A method for fabricating a readout apparatus for a ring laser gyro wherein a pair of counter-propagating laser beams travel around a closed-loop path, and wherein said gyro includes a readout means for establishing a readout interference fringe pattern exiting from an exit surface of said readout means, and wherein said readout interference fringe pattern is derived from a portion of each of said counter-propagating laser beams, and wherein there is at least a pair of photodetectors responsive to said interference fringe pattern, said method comprising:

produce a photographic image of said readout interference fringe pattern thereby producing alternating stripe regions of opaqueness and transparency having substantially the same spatial profile as said readout interference fringe pattern; and interposing said photographic image between said exit surface and said photodetectors such that portions of said readout interference fringe pattern pass therethrough and impinge upon said photodetectors; and orienting said photographic image such that said stripe regions are at a selected angle relative to said fringes of said readout interference fringe pattern.

2. The method of claim 1 wherein said photographic image is a photosensitive film.

3. The method of claim 2 wherein said photographic image is a photographic negative.

4. The method of claim 1 wherein said selected angle is an acute angle.

5. The method of claim 1 further comprising the steps of:

operating said ring laser gyro in a manner such that said readout interference fringe pattern is stationary, exhibiting substantially no motion; and producing a photographic image of said stationary fringe, thereby producing alternating stripe regions of opaqueness and transparency.

6. The method of claim 1 wherein said pair of photodetectors are positioned to be concurrently responsive to portions of the same spatial fringes of said readout interference fringe pattern.

7. The method of claim 1 wherein said pair of photodetectors are spatially separated and are positioned to be responsive to different spatial fringes of said readout interference fringe pattern.

8. A method for fabricating a readout apparatus for a ring laser gyro wherein a pair of counter-propagating laser beams travel around a closed-loop path, and wherein said gyro includes a readout means for establishing a readout interference fringe pattern exiting from an exit surface of said readout means, and wherein said readout interference fringe pattern is derived from a portion of each of said counter-propagating laser beams, and wherein there is a photo sensor having a photosensitive surface thereon to provide a pair of photodetectors responsive to said interference fringe pattern, said method comprising:

positioning said photo sensitive sensor in a position to receive said readout interference fringe pattern;

permitting the photo sensitivity of said photosensitive surface to be destructively altered in proportion to the intensity of said readout interference fringe pattern;

removing said sensor;

modifying said photosensitive surface to prevent said photosensitive surface from being further altered in response to any impinging light thereon;

positioning said sensor to be responsive to said readout interference fringe pattern; and orienting said photo sensor such that said pair of photodetectors have output signals out of phase with each other in response to a moving fringe pattern impinging thereon.

9. The method of claim 8 wherein said pair of photodetectors are positioned to be concurrently responsive to portions of the same spatial fringes o said readout interference fringe pattern.

10. The method of claim 8 wherein said pair of photodetectors are spatially separated and are positioned to be responsive to different spatial fringes of said readout interference fringe pattern.

* * * * *